United States Patent
States et al.

(10) Patent No.: US 8,151,928 B2
(45) Date of Patent: Apr. 10, 2012

(54) WORK MACHINE OPERATOR INPUT ASSEMBLY

(75) Inventors: Douglas S. States, Hermantown, MN (US); Wolfgang Grabner, Graz (AT); David J. Klas, New Vienna, IA (US)

(73) Assignee: Deere & Company, Moline, IL (US)

( * ) Notice: Subject to any disclaimer, the term of this patent is extended or adjusted under 35 U.S.C. 154(b) by 938 days.

(21) Appl. No.: 12/125,654

(22) Filed: May 22, 2008

(65) Prior Publication Data

US 2008/0308400 A1 Dec. 18, 2008

Related U.S. Application Data

(60) Provisional application No. 60/944,334, filed on Jun. 15, 2007.

(51) Int. Cl.
*B60K 26/00* (2006.01)
(52) U.S. Cl. ........ 180/315; 180/332; 180/333; 180/335; 200/339; 200/553; 200/557
(58) Field of Classification Search .................. 180/315, 180/332, 333, 335, 336; 273/148 B; 200/339, 200/553, 557
See application file for complete search history.

(56) References Cited

U.S. PATENT DOCUMENTS

| | | | | |
|---|---|---|---|---|
| 2,725,438 A | * | 11/1955 | Bentley | 200/557 |
| 3,108,651 A | * | 10/1963 | Miller | 180/90.6 |
| 4,501,424 A | * | 2/1985 | Stone et al. | 273/148 B |
| 5,160,918 A | * | 11/1992 | Saposnik et al. | 345/161 |
| 5,642,806 A | * | 7/1997 | Karadimas | 200/557 |

OTHER PUBLICATIONS http;//www.huscointl.com/constructionMaterialHandling/products/ConstructionIHD808.asp.
Penny+Giles; JC60000 Multi Axis Joystick Controller; pp. 9, 12, and 13.
Penny+Giles; JC150 Rugges Single-Axis Joystick; p. 6.
Otto; Grip Joystick Catalog; pp. 9, 10 and 11.

* cited by examiner

*Primary Examiner* — Eric Culbreth
(74) *Attorney, Agent, or Firm* — Taylor IP, P.C.

(57) ABSTRACT

An operator input assembly includes an operator input device. The operator input device includes a paddle and a leaf spring interfacing with the paddle so as to bias the paddle to a predetermined position. The paddle includes a region which interfaces with the leaf spring.

4 Claims, 10 Drawing Sheets

WORK MACHINE OPERATOR INPUT ASSEMBLY

CROSS REFERENCE TO RELATED APPLICATIONS

This is a non-provisional application based upon U.S. provisional patent application Ser. No. 60/944,334, entitled "WORK MACHINE OPERATOR INPUT ASSEMBLY", filed Jun. 15, 2007, which is incorporated herein by reference.

BACKGROUND OF THE INVENTION

1. Field of the Invention

The present invention relates to work machines, and, more particularly, to operator input assemblies for work machines.

2. Description of the Related Art

Work machines are found in the construction, forestry, and agricultural industries. An operator typically can control a number of functions at an operator station of the work machine. The operator station, thus, typically includes a number of operator input devices which the operator can operate as needed to control the functions of the work machine.

What is needed in the art is a compact operator input device suitable for mounting on a joystick.

SUMMARY OF THE INVENTION

The present invention provides a compact operator input device suitable for mounting on a joystick.

The invention in one form is directed to an operator input assembly including an operator input device. The operator input device includes a paddle and a leaf spring interfacing with the paddle so as to bias the paddle to a predetermined position. The paddle includes a region interfacing with the leaf spring.

The invention in another form is directed to a machine operating system including an operator input device. The operator input device includes a plurality of Hall-effect sensors, a magnet, and a pivotable paddle attached to the magnet to swing the magnet in a space between the plurality of Hall-effect sensors upon pivoting the paddle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
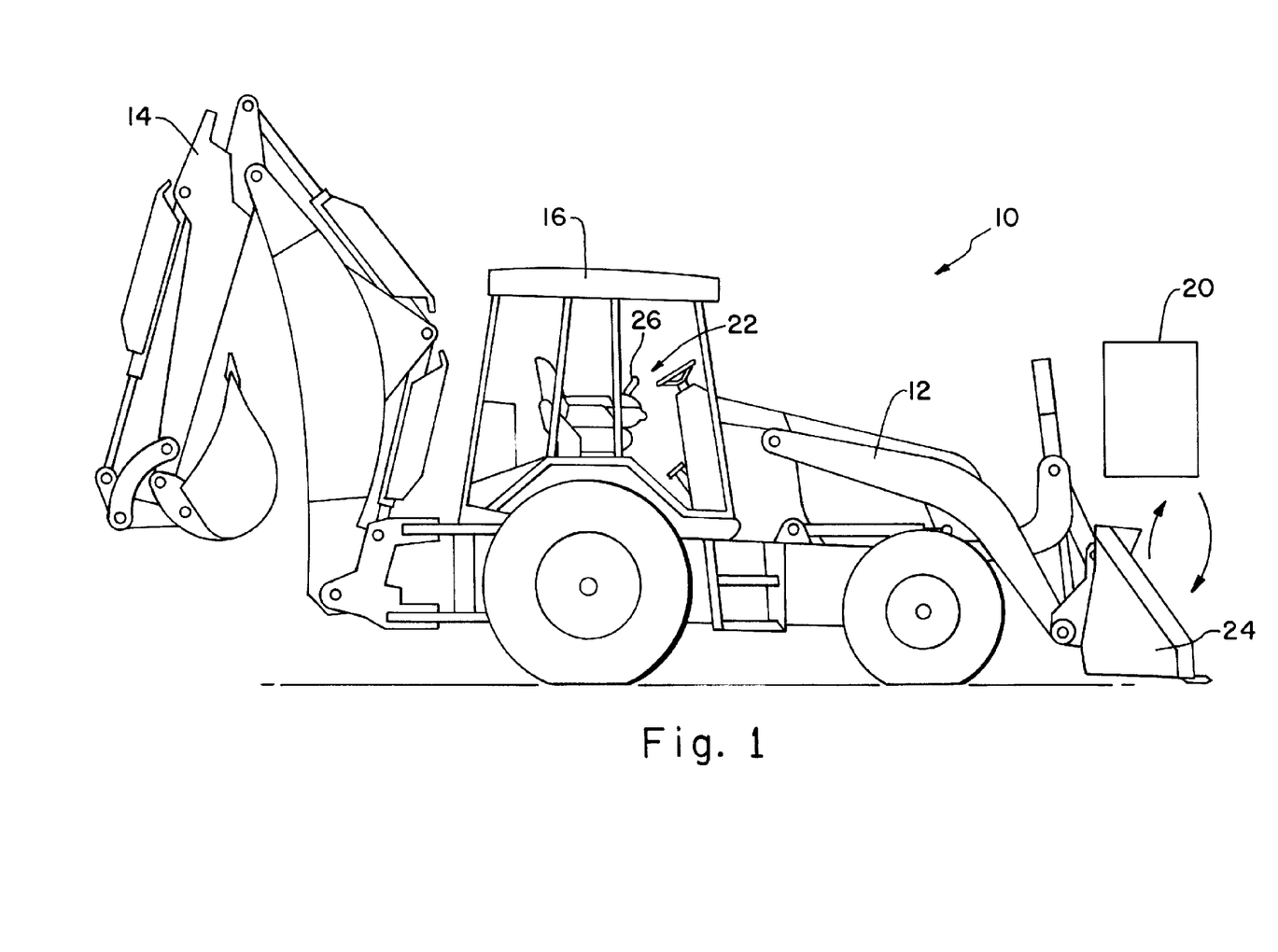
FIG. 1 is a partially schematic, side view of a work machine with an operator input assembly according to the present invention.
Figure 2:
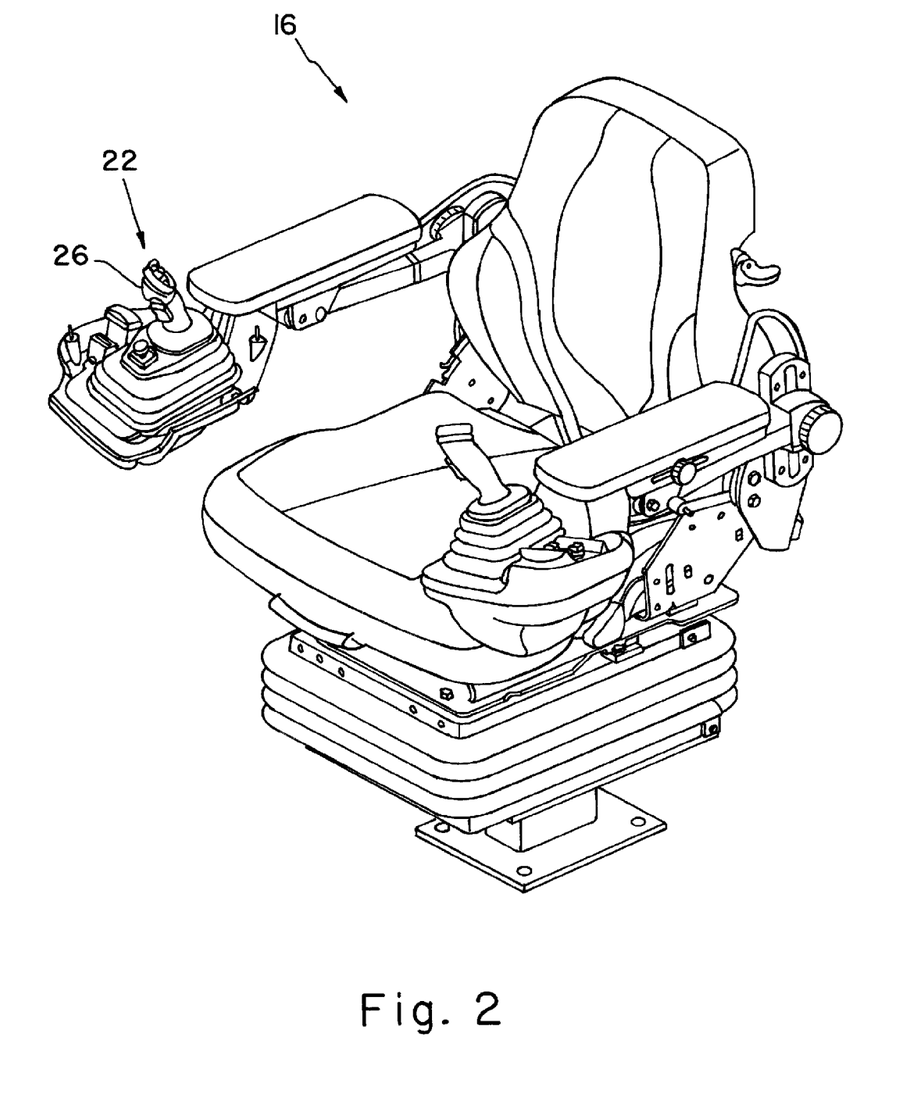
FIG. 2 is a perspective view of an operator station with the operator input assembly according to the present invention.

Referring now to the drawings, and more particularly to FIGS. 1-2, there is shown a work machine 10 configured, for example, as a loader backhoe. It is understood that work machine 10 can be any type of work machine, including, but not limited to, work machines found in the construction, forestry, and agricultural industries. Work machine 10 generally includes a loader portion 12, a backhoe portion 14, an operator station 16 in which an operator can operate work machine 10, and a machine operating system 18 (more specifically shown in FIG. 12) which can be a control system used to operate a tool using an operator input assembly 22. The tool, for example, can be an auxiliary tool 20. Auxiliary tool 20 can include a number of output devices (such as an auger or a trencher) which can be driven electrically or hydraulically. As indicated by reverse arrows in FIG. 1, bucket 24 can be detached from loader portion 12, and auxiliary tool 20 can be attached to loader portion 12.

Operator station 16 includes operator input assembly 22. Operator station 16 can further include a number of other operator input assemblies. Operator input assembly 22 includes a joystick 26 and one or more operator input devices 28 mounted on joystick 26. FIGS. 3 and 5-9, for example, show two operator input devices mounted on joystick 26, including a first operator input device 28A and a second operator input device 28B. It is understood, however, that operator input devices 28A,28B could be used without a joystick and could, for example, be mounted to a console of the work machine and operated therefrom.

Figure 3:
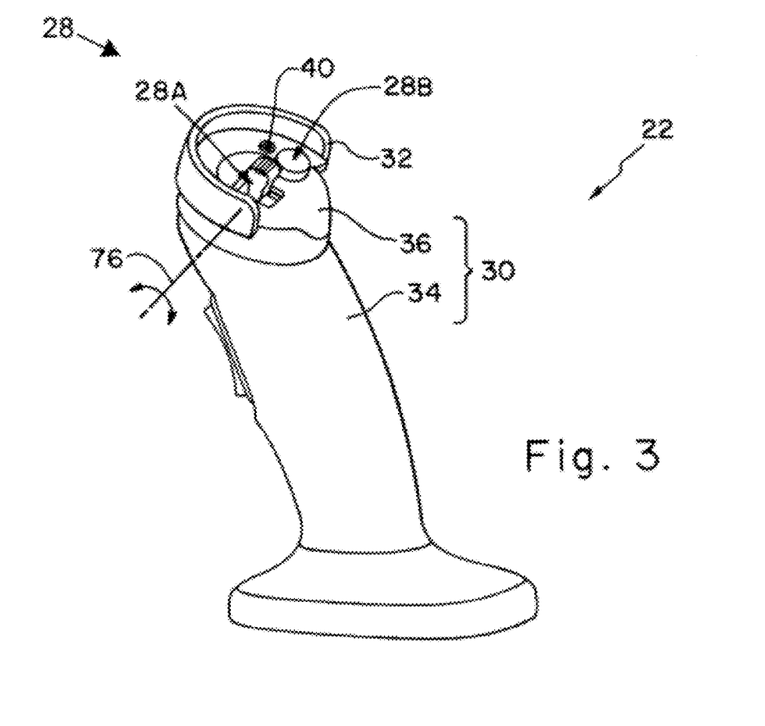
FIG. 3 is a perspective view of one embodiment of the operator input assembly according to the present invention.
Figure 4:
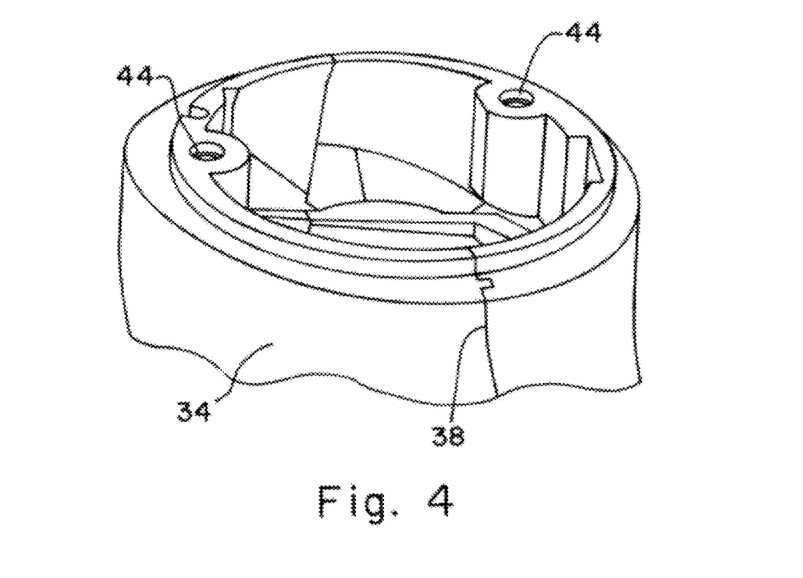
FIG. 4 is a fragmentary, perspective view of the handgrip portion of a joystick.
Figure 5:
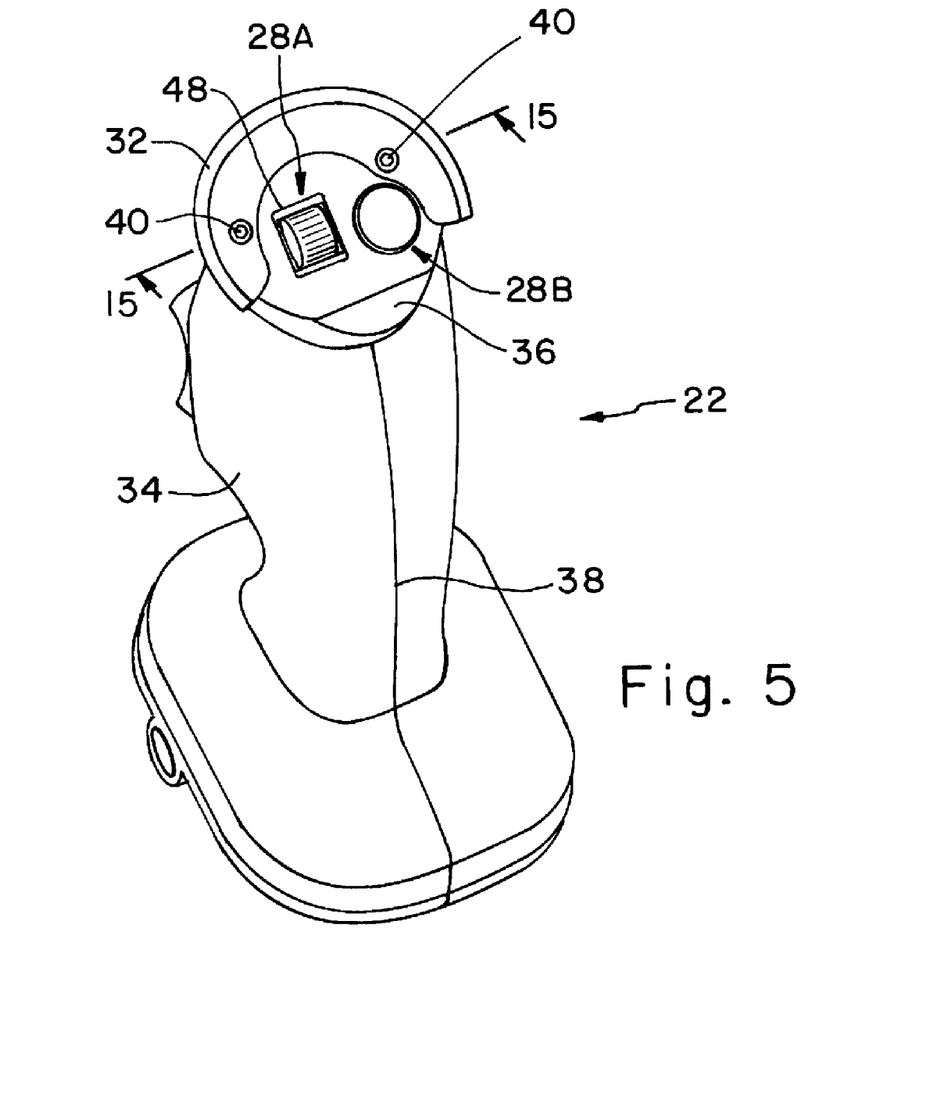
FIG. 5 is a perspective view another embodiment of the operator input assembly according to the present invention.
Figure 6:
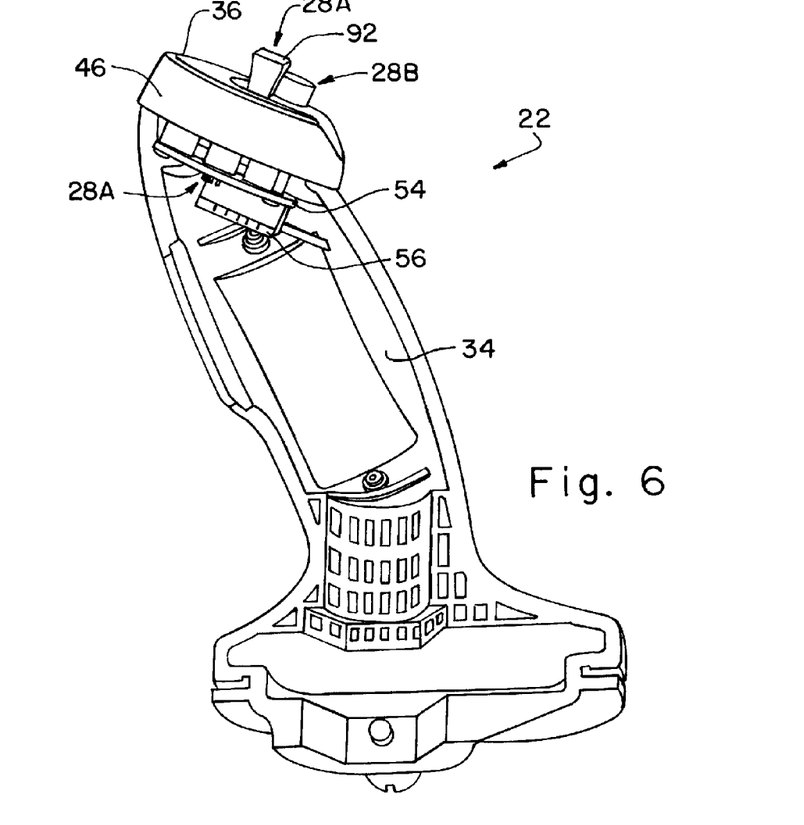
FIG. 6 is a fragmentary, side view of the operator input assembly of FIG. 5 with one half of the handgrip portion broken away along seam 38 and showing the operator input device of the present invention.
Figure 7:
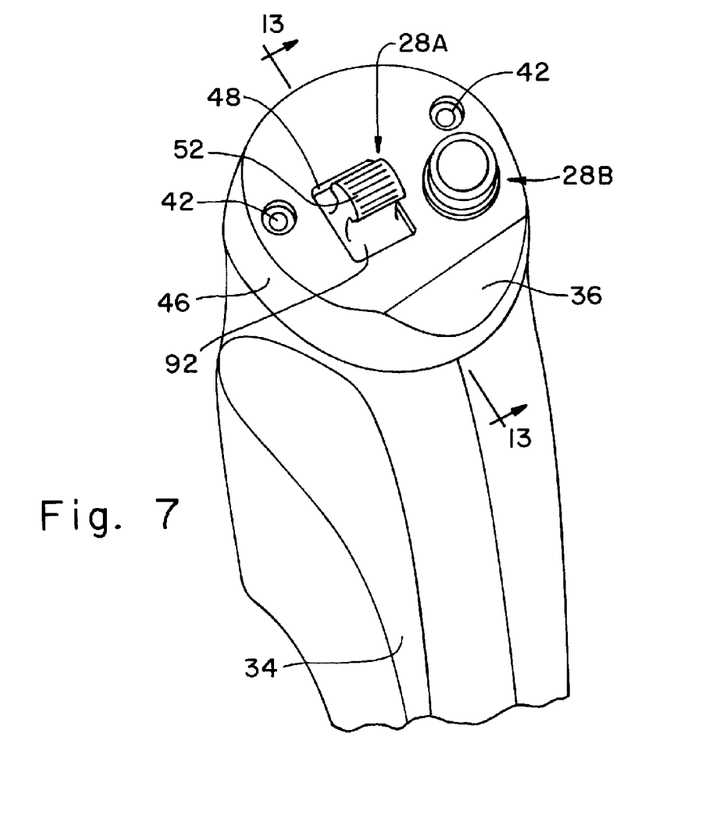
FIG. 7 is a fragmentary, perspective view of operator input assembly of FIG. 5.
Figure 8:
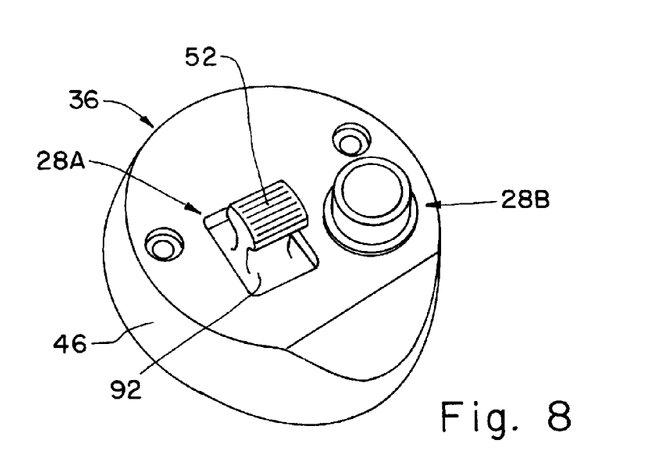
FIG. 8 is a fragmentary, perspective view of the operator input assembly of FIG. 5 with portions below the cap broken away.
Figure 9:
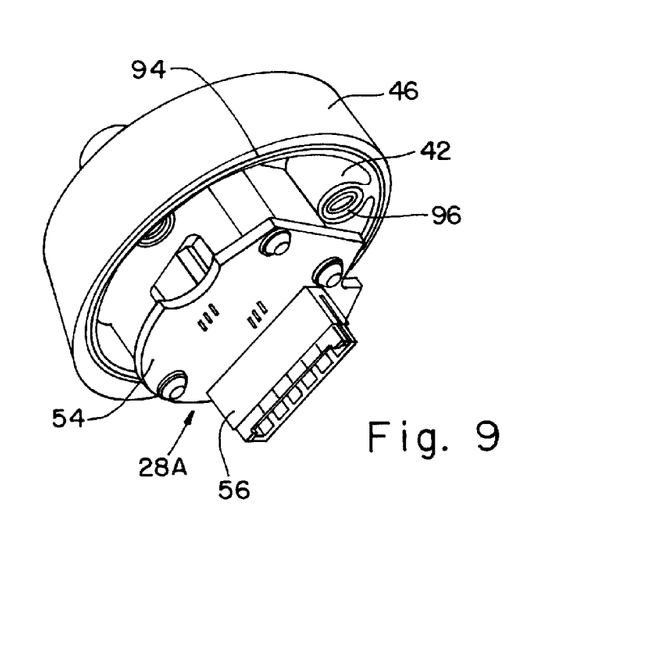
FIG. 9 is a fragmentary, perspective view of the operator input assembly of FIG. 5 showing the operator input device mounted to the cap.
Figure 15:
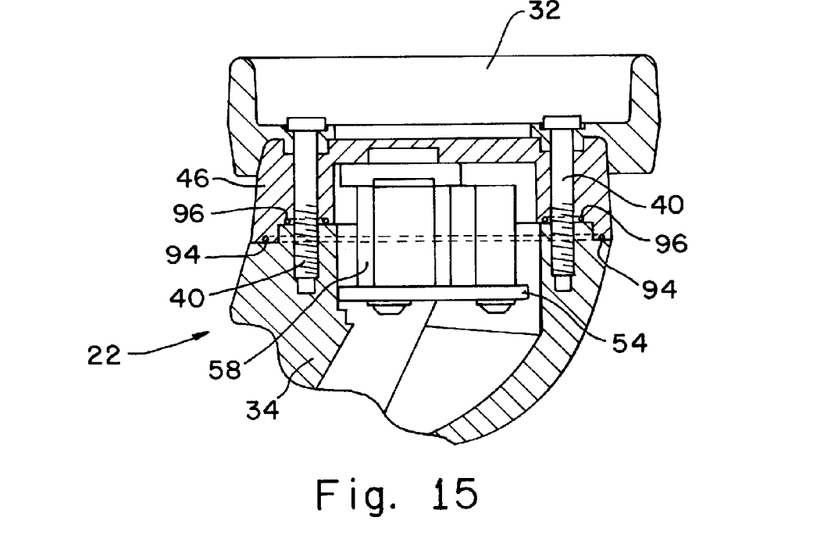
FIG. 15 is a fragmentary, section view of the rim, the cap, the handgrip portion, and the operator input device of the present invention, the section taken along line 15-15 in FIG. 5.

Referring to FIGS. 3-6, joystick 26 includes a housing 30 and can include a rim 32. Housing 30 includes a handgrip portion 34 and a cap 36. Handgrip portion 34 can be an elongated shell having a shape configured for comfortable gripping by an operator. The shell can include two halves which fit together to form handgrip portion 34, the two halves forming a seam 38. Cap 36 fits on a top portion of handgrip portion 34 and can be fastened to handgrip portion 34 using two fasteners 40, such as screws. Each screw 40 can be inserted in a fastener receiving sleeve 42 extending from a top surface of cap 36 towards an interior of handgrip portion 34, screws 40 being screwed into a receiving portion 44 on handgrip portion 34. Cap 36 further includes a skirt 46 along a circumferential edge of cap 36 and extending down from the top surface of cap 36 towards handgrip portion 34. Cap 36 can further include a plurality of apertures 48 each configured for receiving and allowing at least a portion of an operator input device 28 to protrude therethrough. For instance, operator input device 28A includes a paddle 50 with a thumb-actuating portion 52 (which can also be called the operator interface portion 52) extending through one aperture 48, the thumb-actuating portion 52 being able to move forwardly and rearwardly relative to a central neutral position. Second operator input device 28B includes a thumb-depressing portion which can extend through a second aperture 48. Rim 32 attaches to the top surface of cap 36 using fasteners 40, as shown in FIGS. 3, 5, and 15. Alternatively, rim 32 can be formed integral with cap 36. Rim 32 may travel only partially around the circumferential edge of cap 36, thereby enabling the operator to easily access operator input devices 28 on the top of joystick 26 while also protecting the portions of operator input devices 28 which extend through apertures 48 of cap 36. FIGS. 6-7 show joystick 26 without rim 32. FIGS. 7-8 show fastener receiving sleeves 42 without fasteners 40.

Figure 10:
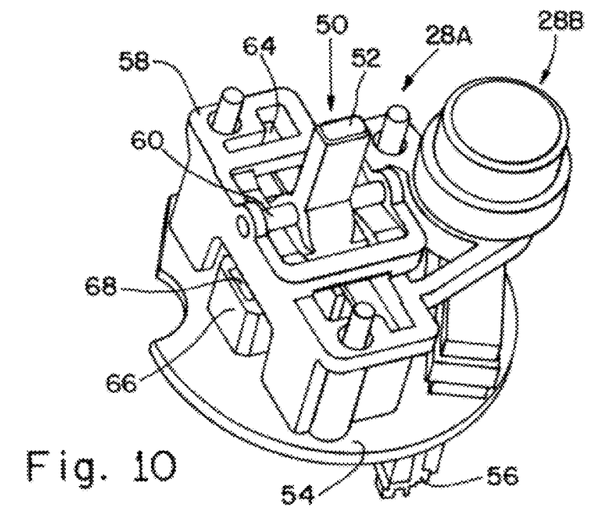
FIG. 10 is a perspective view of the operator input device of the present invention.

Referring to FIGS. 6-13, operator input assembly 22 can include at least two operator input devices 28A,28B, the focus herein being on device 28A. Operator input assembly 22 includes a circuit board 54, operator input devices 28A,28B mounted to circuit board 54, and a connector 56 mounted to circuit board 54 and configured for sending a signal representative of position information from a sensor of operator input device 28A. Operator input device 28A includes a paddle base 58 mounted to circuit board 54, a pivot pin 60, a paddle 50 to control, for example, auxiliary tool 20, a magnet 62, a leaf spring 64, a sensor base 66 mounted to circuit board 54, and a pair of Hall-effect sensors 68 mounted to sensor base 66 so as to generally face each other. Paddle base 58 can have a generally rectangular box shape, as shown in FIG. 10. Paddle base 58 serves as a base on which pivot pin 60, paddle 50, and leaf spring 64 are mounted. Pivot pin 60 has a generally cylindrical shape and includes opposing longitudinal ends which are mounted to paddle base 58. Pivot pin 60 can be mounted to paddle base 58 generally on a top surface of paddle base 58 approximately midway between longitudinal ends of paddle base 58, the bottom surface of paddle base being generally coupled with circuit board 54.

Paddle 50 is pivotable about a pivot point 70. Pivot point 70 can be formed by a generally cylindrical hole extending transversely and generally perpendicularly between opposing first and second longitudinal sides 72,74 of paddle 50, pivot pin 60 being inserted through the pivot pin hole of paddle 50 and paddle 50 rotating about pivot pin 60. Alternatively, pivot pin 60 can be formed integral with paddle 50 and, thus, rotate at least somewhat freely within mounts coupling pivot pin 60 with paddle base 58. Thus, paddle 50 is rotatable about axis 76, as shown in FIG. 3. The arcuate arrow in FIG. 3 shows the direction of rotation of paddle 50—particularly operator interface portion 52 of paddle 50—about axis 76. To one side (the upper side in FIG. 11) of pivot point 70 is operator interface portion 52 of paddle 50. To the opposite side (the bottom side in FIG. 11) of pivot point 70 is a magnet holder 78 of paddle 50. Operator interface portion 52 can have a generally rectangular shape. Operator interface portion 52 is configured for being rotated forwardly or rearwardly as directed by an operator. Further, operator interface portion 52 has a neutral position which is generally upright and which can be centrally positioned between the farthest extents of travel both fore and aft of the operator interface portion 52.

Figure 11:
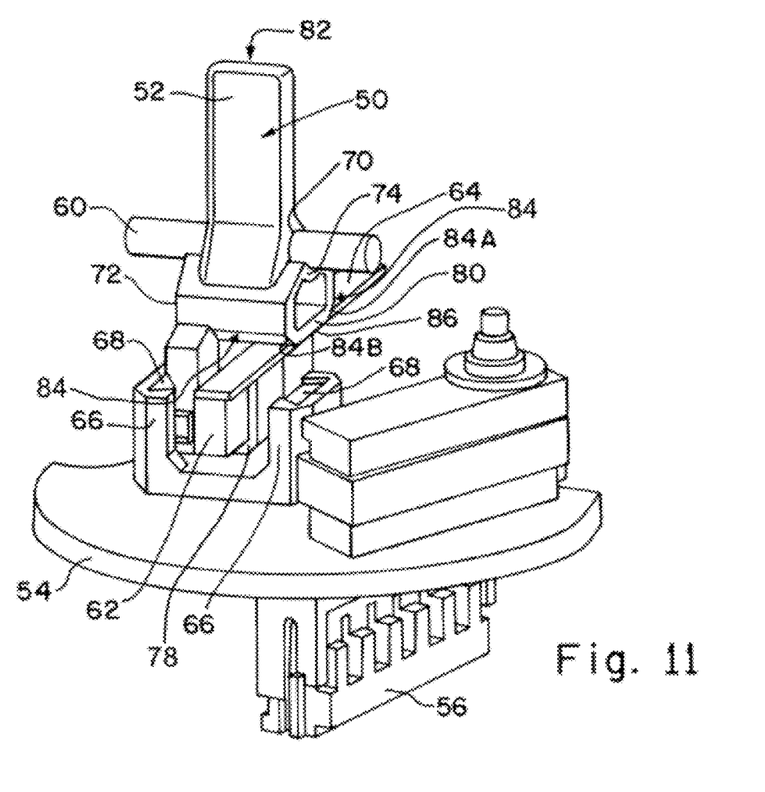
FIG. 11 is a fragmentary, perspective view of the operator input device of the present invention.

Magnet holder 78 includes a plurality of walls including exterior surfaces and interior surfaces, the interior surfaces contacting magnet 62 held by magnet holder 78. The interior surfaces of magnet holder 78 can define a generally square, rectangular, or circular cross-sectional shape to accommodate a corresponding cross-sectionally shaped magnet 62 (FIG. 11 showing magnet holder 78 and magnet 62 with generally rectangularly shaped cross-sections). Running in a longitudinal direction of magnet 62, magnet 62 can extend beyond front and rear faces of magnet holder 78. Magnet holder 78 can form a snap fit with magnet 62. First longitudinal side 72 of paddle 50 can include magnet holder 78.

Paddle 50 further includes an interfacing region 80 positioned below pivot point 70 and above magnet holder 78. Interfacing region 80 interfaces with (i.e., contacts) leaf spring 64 which biases paddle 50 to a predetermined position 82. As indicated above, predetermined position 82 is a generally central, upright position for operator interface portion 52 of paddle 50. Stated another way, operator interface portion 52 occupies a twelve o'clock position in predetermined position 82 while magnet holder 78 occupies a six o'clock position. Interfacing region 80 can include a contoured region 80 including two beveled surfaces 84 (the forward beveled surface being denominated as 84A and the rear beveled surface being denominated as 84B) and an intermediate surface 86 between beveled surfaces 84. Second longitudinal side 74 of paddle 50 can include contoured region 80. Each beveled surface 84 forms an edge with intermediate surface 86. Each beveled surface 84 can extend at a forty-five degree angle relative to intermediate surface 86. Intermediate surface 86 is associated with the neutral position (predetermined position 82) of operator interface portion 52 of paddle 50. Each beveled surface 84 can form a hold detent 84. As operator interface portion 52 is pressed forward, for example, the edge between the forward beveled surface 84A and intermediate surface 86 slides on leaf spring 64 causing leaf spring 64 to depress (forming, effectively, a smile in leaf spring 64). As operator interface portion 52 continues to be pressed forward, eventually forward beveled surface 84A generally contacts leaf spring 64 (or, opposing edges of forward beveled surface 84A contact leaf spring 64 in the event of curvature in that portion leaf spring 64 associated with forward beveled surface 84A) at the end of this forward travel and can then serve to hold paddle 50 in place. Intermediate surface 86, forward beveled surface 84A, and rear beveled surface 84B are, thus, associated with three stationary positions of paddle 50 (and, thus, operator interface portion 52).

Paddle 50 can be formed as a single piece. For instance, magnet holder 78 can be formed integral with operator interface portion 52. Alternatively, one or more components of paddle 50 can be formed separately and attached together to form paddle 50.

Leaf spring 64 is mounted to paddle base 58. In so mounting leaf spring 64, longitudinal ends of leaf spring 64 can be placed on shoulders of paddle base 58. When paddle 50 is in the neutral position, leaf spring 64 is generally flat and a top surface of leaf spring contacts intermediate surface 86 of region 80. It is understood that one or more resilient members could be used in place of leaf spring 64. For instance, a pair of coil springs or elastomeric blocks could be positioned forward of and behind paddle 50 so as to bias paddle 50 to a central neutral position (i.e., predetermined position 82), the coil springs or elastomeric blocks being mounted to paddle base 58.

Sensor base 66 is mounted to circuit board 54. Sensor base 66 includes two upstanding portions each of which holds a Hall-effect sensor 68. Each upstanding portion of sensor base 66 includes an open face; these open faces face each other. Hall-effect sensors 68 generally face each other and include a space therebetween.

Figure 12:
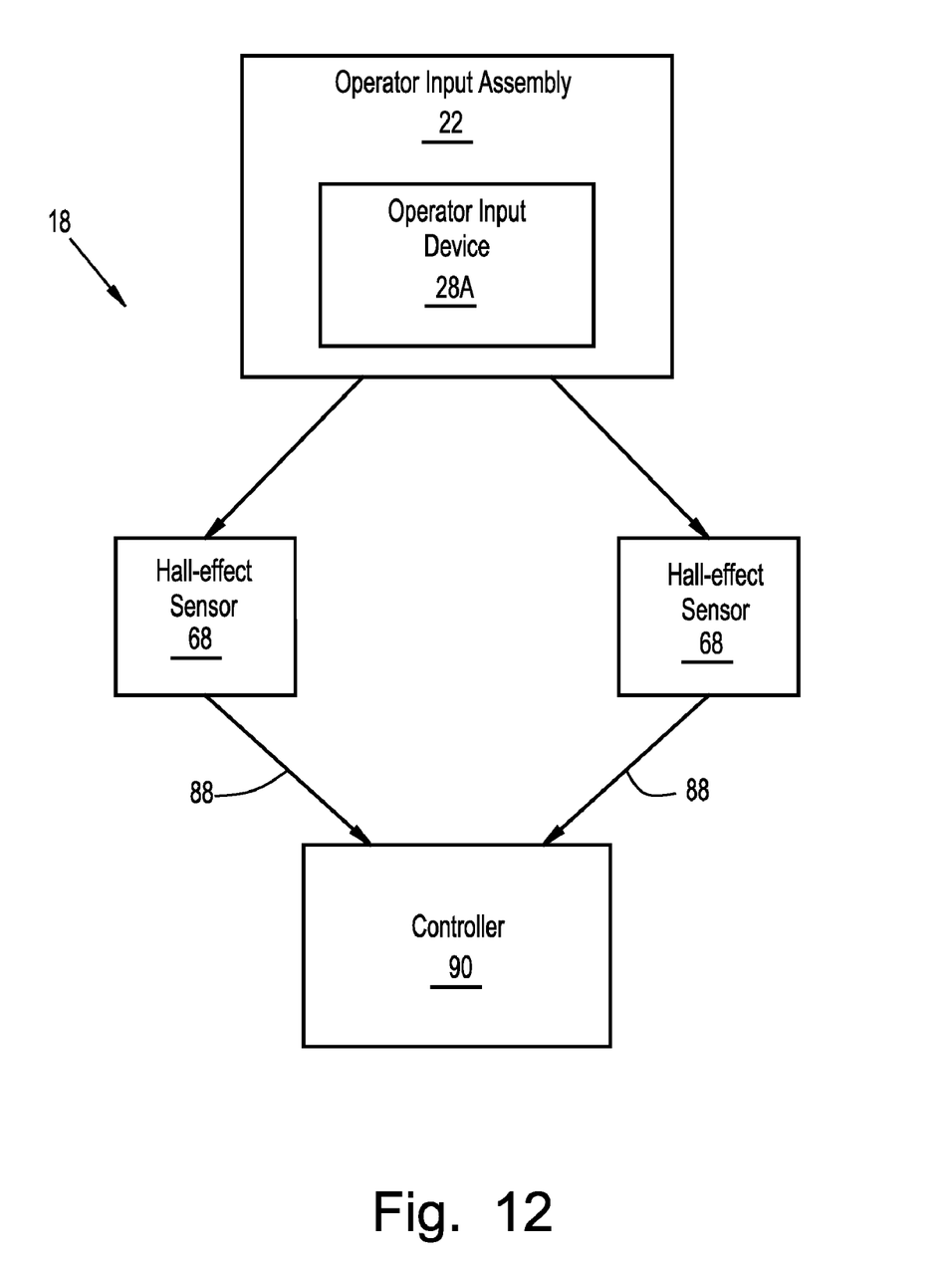
FIG. 12 is a schematic of the control system associated with the present invention.
Figure 13:
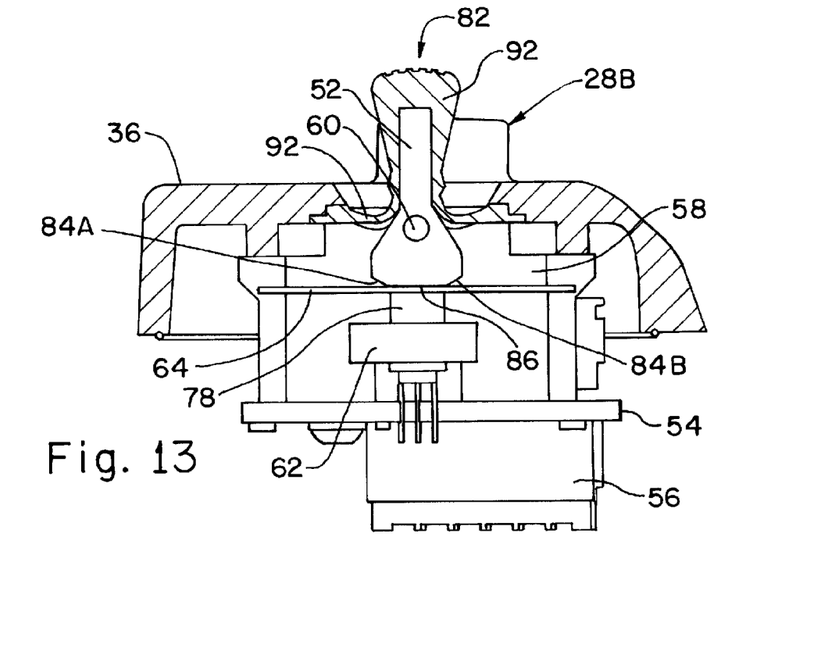
FIG. 13 is a section view of the cap and the operator input device of the present invention, the section taken along line 13-13 in FIG. 7.

Generally, Hall-effect sensor 68 is a transducer which varies its output voltage in response to changes in magnetic field density. In response to operator input, paddle 50 swings magnet 62 (held by magnet holder 78) in the space between Hall-effect sensors 68 upon pivoting paddle 50. Paddle 50 can be spaced apart from Hall-effect sensors 68. It is understood that "between" the Hall-effect sensors 68 can mean actually physically positioned between sensors 68 or can mean magnetically between the sensors 68, where magnetically between refers to the effect of the magnetic field and not necessarily actually physically between sensors 68. Hall-effect sensors 68 sense changes in magnetic field density due to movement of magnet 62 and can provide corresponding output signals 88 (which can be analog signals) to a controller 90 as indicated in FIG. 12, which can send further signals to auxiliary tool 20. Hall-effect sensors 68 can be configured so as to have two sensor outputs which cross each other or which are parallel to one another. More specifically, the voltage signal output of each Hall-effect sensor can correspond to degrees of swing of magnet 62. That is, for example, the voltage output can range between 0 and 5 volts, where 0 volts is associated with −20 degrees (i.e., 20 degrees forward swing), 2.5 volts is associated with 0 degrees (i.e., magnet holder in neutral or six o'clock position), and 5 volts is associated with +20 degrees (i.e., 20 degrees rearward swing). The reverse association can be made as well (i.e., 0 volts associated with −20 degrees and 5 volts associated with +20 degrees). When the sensor outputs cross each other (on a graph), one sensor can have the former associations and the other sensor can have the latter (the reverse) associations. When the sensor outputs are parallel with one another (on a graph), each sensor has like associations (not reverse associations relative to one another). Controller 90 receives and can compare a plurality of output signals 88 from Hall-effect sensors 68 for fault detection of sensors 68. Sensors 68 can be cross-checked on board (such as on circuit board 54) or can be checked by controller 90. One Hall-effect sensor 68 can serve in a redundant capacity relative to the other Hall-effect sensor 68.

Referring to FIGS. 5-9 and 13, operator input assembly 22 can further include a protective boot 92 at least partially about paddle 50. More specifically, protective boot 92 can surround operator interface portion 52 of paddle 50. Protective boot 92 and housing 30 (such as cap 36) can cooperate to form a sealed connection therebetween. Protective boot 92 can be a thin, highly flexible membrane pushed over operator interface portion 52 of paddle 50 and sealed into cap 36. Protective boot 92, thus, serves to seal dust, liquids, and other contaminants from entering the interior of joystick 26 via aperture 48 on cap 36 associated with paddle 50 and damaging internal components of operator input assembly 22. Protective boot 92 also provides a soft interface between the operator and paddle 50. Protective boot 92 can be made of an elastomeric or rubber material. It is noted that FIGS. 3 and 10-11 do not show a protective boot 92 about operator interface portion of paddle 50, while FIGS. 5-9 and 13 do.

Figure 14:
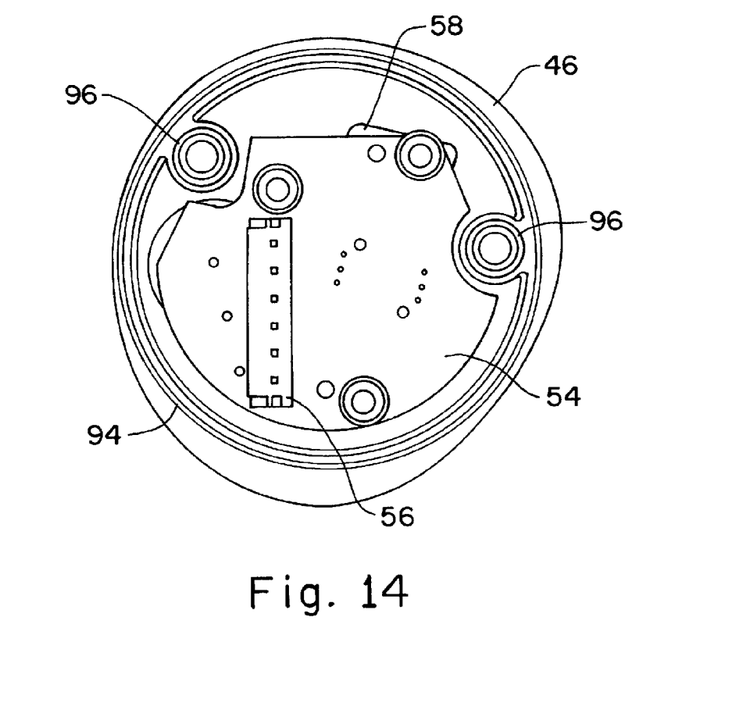
FIG. 14 is a bottom view of the cap and the operator input device of the present invention.
Figure 16:
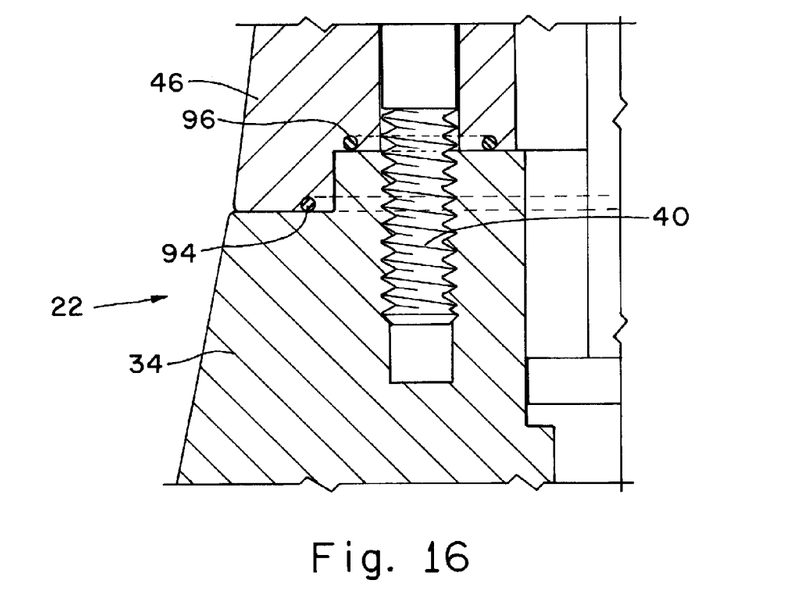
FIG. 16 is an enlarged, fragmentary, section view of two of the seals shown on the left side in FIG. 15.

Referring to FIGS. 14-16, operator input assembly 22 can further include a plurality of seals 94,96 which establish a sealed connection between handgrip portion 34 and cap 36 of joystick 26 so as to prevent dust, liquids, and other contaminants from entering the interior of joystick 26 and damaging internal components of operator interface assembly 52. Seals 94,96 can be made of an elastomeric or rubber material. Cap 36 can at least partially encapsulate seals 94,96. Seals 94,96 include a first seal 94 coupled with skirt 46 of cap 36. First seal 94 circumferentially travels a bottom surface of skirt 46. First seal 94 can be molded (i.e., using injection molding, insert molding, and/or overmolding) with skirt 46 or press fit with skirt 46. Thus, skirt 46 can at least partially encapsulate first seal 94. Seals 94,96 can also include one or more second seals 96 coupled with each fastener receiving sleeve 42, each of which can be generally cylindrical in shape. Second seals 96 circumferentially travel a bottom surface of each fastener receiving sleeve 42. Second seals 96 can be molded (i.e., using injection molding, insert molding, and/or overmolding) with corresponding sleeves 42 or press fit with corresponding sleeves 42. Thus, fastener receiving sleeves 42 can at least partially encapsulate second seals 96. FIGS. 15 and 16 show portions of seals 94 and 96 in hidden lines so as to show seals 94 and 96 circling around with the corresponding skirt 46 and sleeve 42, as shown in FIG. 14.

In use, operator moves forwardly or rearwardly operator interface portion 52 of paddle 50. Leaf spring 64 biases paddle 50 to the central (neutral) position but can cooperate with beveled surfaces 84 of interfacing region 80 of paddle 50 so as to provide a hold detent 84 in the maximum forward and rearward positions. In moving operator interface portion 52 of paddle 50, paddle 50 pivots about pivot point 70 and swings magnet 62 in magnet holder 78 in a space between two Hall-effect sensors 68. In response, sensors 68 then output signals 88 to controller 90, which aids in controlling a tool such as auxiliary tool 20.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An operator input assembly comprising:
    an operator input device including a paddle defining a region and at least one resilient member interfacing with said region of said paddle so as to bias said paddle to a predetermined position;
    a joystick, said operator input device being mounted on said joystick;
    a protective boot at least partially about said paddle, said joystick including a housing, said protective boot and said housing cooperating to form a sealed connection therebetween; and,
    a plurality of seals, said joystick including a housing which includes a handgrip portion and a cap which couples with said handgrip portion, said plurality of seals establishing a sealed connection between said handgrip portion and said cap.

2. The operator input assembly of claim 1, wherein said cap at least partially encapsulates said plurality of seals.

3. The operator input assembly of claim 2, wherein said plurality of seals includes a first seal, said cap including a skirt coupled with said first seal.

4. The operator input assembly of claim 2, wherein said plurality of seals includes a second seal, said cap including a fastener receiving sleeve coupled with said second seal.

\* \* \* \* \*